United States Patent
Ohno

(10) Patent No.: US 12,276,616 B2
(45) Date of Patent: Apr. 15, 2025

(54) OPTICAL INSPECTION APPARATUS, PROCESSING DEVICE, OPTICAL INSPECTION METHOD, AND NON-TRANSITORY STORAGE MEDIUM STORING OPTICAL INSPECTION PROGRAM

(71) Applicant: KABUSHIKI KAISHA TOSHIBA, Tokyo (JP)

(72) Inventor: Hiroshi Ohno, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 190 days.

(21) Appl. No.: 17/899,496

(22) Filed: Aug. 30, 2022

(65) Prior Publication Data

US 2023/0324309 A1    Oct. 12, 2023

(30) Foreign Application Priority Data

Mar. 22, 2022  (JP) ................. 2022-045287

(51) Int. Cl.
*G01N 21/88* (2006.01)
*G01B 11/30* (2006.01)
*H04N 23/72* (2023.01)

(52) U.S. Cl.
CPC ....... *G01N 21/8851* (2013.01); *G01B 11/306* (2013.01); *G01N 21/8806* (2013.01); *H04N 23/72* (2023.01); *G01N 2201/068* (2013.01)

(58) Field of Classification Search
CPC ......... G01N 21/8851; G01N 2201/068; G01N 2021/8845; G01N 21/8806; G01N 21/956;

(Continued)

(56) References Cited

U.S. PATENT DOCUMENTS

| 5,675,407 A | 10/1997 | Geng |
| 7,295,303 B1 * | 11/2007 | Vaez-Iravani .......... G02B 21/06 356/237.4 |

(Continued)

FOREIGN PATENT DOCUMENTS

| JP | 2003-240730 A | 8/2003 |
| JP | 2008-209726 A | 9/2008 |

(Continued)

OTHER PUBLICATIONS

W.L. Howes "Rainbow schlieren and its applications," Applied Optics, vol. 23, No. 14, pp. 2449-2460 (1984).

(Continued)

*Primary Examiner* — Christina A Riddle
(74) *Attorney, Agent, or Firm* — Finnegan, Henderson, Farabow, Garrett & Dunner, LLP

(57) ABSTRACT

According to an embodiment, an optical inspection apparatus includes an imaging portion, a first wavelength selection portion, an illumination portion, and a second wavelength selection portion. The imaging portion includes an image sensor configured to capture a subject by light from the subject. The first wavelength selection portion is provided on an optical axis of the imaging portion and is configured to selectively pass a plurality of light components of predetermined wavelengths. The illumination portion is configured to illuminate the subject. The second wavelength selection portion is provided on an optical axis of the illumination portion and is configured to pass the plurality of light components of the predetermined wavelengths complementarily to the first wavelength selection portion.

12 Claims, 11 Drawing Sheets

(58) Field of Classification Search
CPC ......... G01N 21/9501; G01N 21/95607; G01N 21/94; G01N 2021/95676; G01N 21/21; G01N 21/255; G01N 2021/8848; G01N 2021/9513; G01N 21/95623; G01N 2021/8887; G01N 21/31; G01N 21/4738; G01N 21/4788; G01N 21/55; G01N 15/0205; G01N 2021/1765; G01N 2021/217; G01N 2021/3133; G01N 2021/4704; G01N 2021/4735; G01N 2021/4752; G01N 2021/4792; G01N 2021/845; G01N 2021/8822; G01N 2021/8825; G01N 2021/8861; G01N 2021/8874; G01N 2021/8924; G01N 2021/9518; G01N 2021/95638; G01N 2021/95653; G01N 21/01; G01N 21/27; G01N 21/29; G01N 21/33; G01N 21/359; G01N 21/41; G01N 21/47; G01N 21/474; G01N 21/64; G01N 21/6458; G01N 21/8901; G01N 21/9505; G01N 21/9515; G01N 21/95684; G01N 2201/061; G01N 2201/063; G01N 2201/0635; G01N 2021/4733; G01N 21/4785; G01N 2021/4702; G01N 2021/4728; G01N 2021/473; G01N 2021/479; G01N 21/4795; G01N 2021/575; G01N 2021/558; G01N 2021/555; G01N 2021/556; G01N 2021/557; G01B 11/306; G01B 11/24; G01B 11/30; G01B 11/303; G01B 11/0633; G01B 11/0625; G01B 11/0616; G01B 11/00; G01B 9/02043; G01B 9/02095; G01B 11/14; G01B 11/2509; H04N 23/72; H04N 23/74; G03F 1/84; G03F 7/70605; G03F 7/70608; G03F 7/70616; G03F 7/7065; G03F 7/706843; G03F 7/706845; G03F 7/706847; G03F 7/706849; G03F 7/706851; G02B 27/1006; G02B 27/1013; G02B 5/204; G02B 5/208; G02B 5/22–24

USPC .......... 356/237.1–237.6, 429–431, 502–425, 356/625–640, 600–613; 359/588, 589, 359/590, 885–892

See application file for complete search history.

(56) References Cited

U.S. PATENT DOCUMENTS

| | | | |
|---|---|---|---|
| 8,228,494 B2* | 7/2012 | Shibata | G01N 21/95623 356/237.4 |
| 9,638,641 B2* | 5/2017 | Masumura | G01N 21/8806 |
| 10,732,102 B2 | 8/2020 | Ohno et al. | |
| 10,812,786 B2 | 10/2020 | Ohno et al. | |
| 2007/0103893 A1* | 5/2007 | Tanaka | G01N 21/956 362/138 |
| 2007/0121106 A1* | 5/2007 | Shibata | G01N 21/8806 356/237.2 |
| 2011/0311132 A1* | 12/2011 | Meimoun | G01B 11/2509 382/162 |
| 2019/0219501 A1* | 7/2019 | Ohno | G01N 21/41 |
| 2019/0364267 A1* | 11/2019 | Ohno | H04N 17/002 |
| 2020/0158657 A1* | 5/2020 | Masumura | G01N 21/21 |
| 2020/0221942 A1* | 7/2020 | Kikuchi | H04N 25/134 |

FOREIGN PATENT DOCUMENTS

| | | |
|---|---|---|
| JP | 6451821 B1 | 1/2019 |
| JP | 2019-124542 A | 7/2019 |
| JP | 2019-203796 A | 11/2019 |

OTHER PUBLICATIONS

Jun-Sik Kim et al., "Multiaperture telecentric lens for 3D reconstruction," Optics Letters, vol. 36, No. 7, pp. 1050-1052 (2011).

P.S. Greenberg et al. "Quantitative rainbow schlieren deflectometry," Applied Optics, vol. 34, No. 19, pp. 3810-3822 and 3 pages of color figures (1995).

H. Ohno et al., "One-shot BRDF imaging system to obtain surface properties," Optical Review, vol. 28, pp. 655-661 (2021).

Japan Patent Office, Office Action in JP App. No. 2022-045287, 9 pages, and machine translation, 9 pages (Dec. 3, 2024).

* cited by examiner

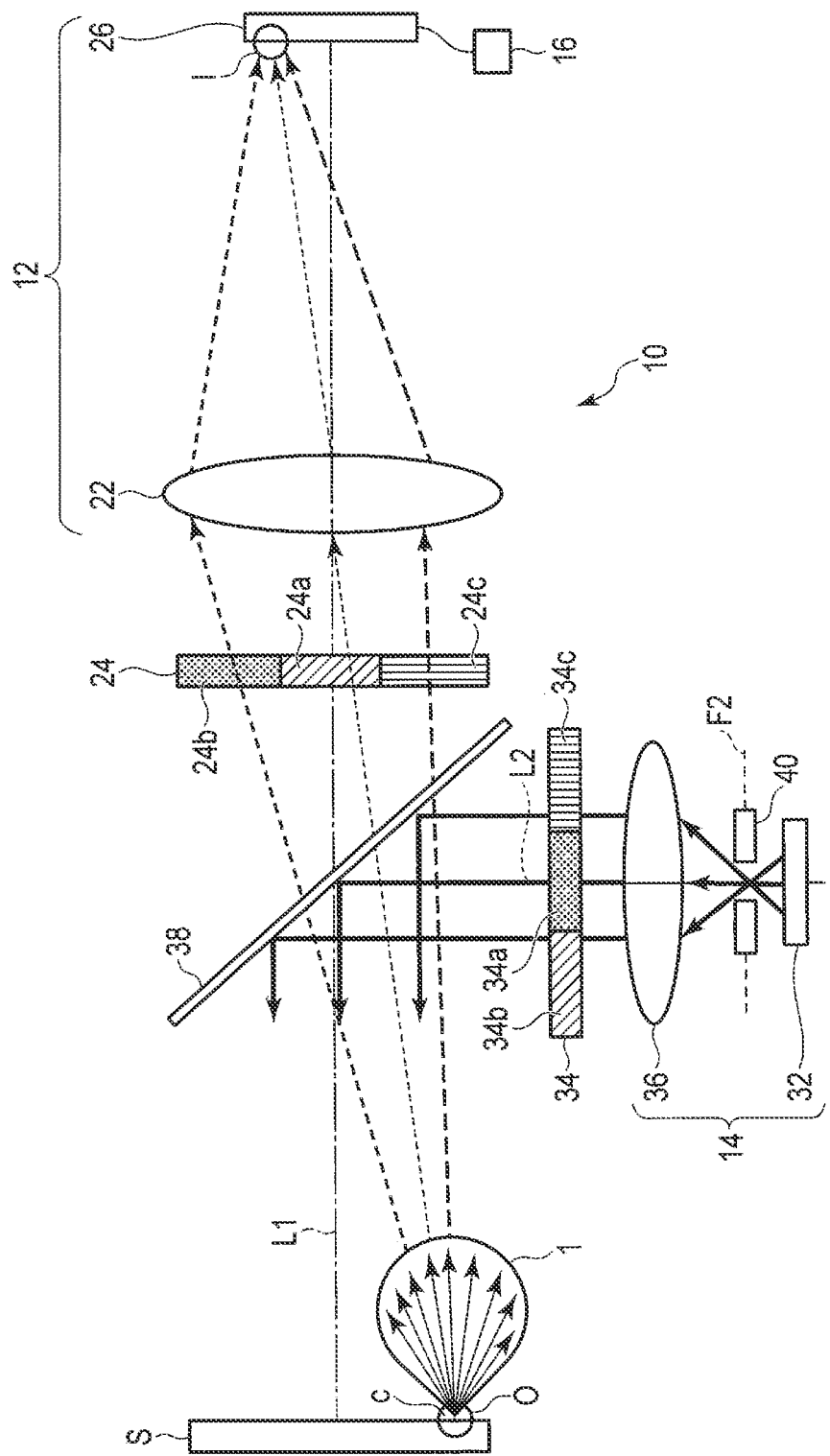
F I G. 16

OPTICAL INSPECTION APPARATUS, PROCESSING DEVICE, OPTICAL INSPECTION METHOD, AND NON-TRANSITORY STORAGE MEDIUM STORING OPTICAL INSPECTION PROGRAM

CROSS-REFERENCE TO RELATED APPLICATIONS

This application is based upon and claims the benefit of priority from Japanese Patent Application No. 2022-045287, filed Mar. 22, 2022, the entire contents of all of which are incorporated herein by reference.

FIELD

Embodiments described herein relate generally to an optical inspection apparatus, a processing device, an optical inspection method, and a non-transitory storage medium storing an optical inspection program.

BACKGROUND

In various industries, surface measurement of an object in a noncontact state is important. As a conventional method, there exists a method of acquiring BRDF information capable of describing the surface state of an object surface by associating a light beam with a color in each direction.

BRIEF DESCRIPTION OF THE DRAWING(S)

FIG. 16 is a schematic sectional view showing the operation principle of an optical inspection apparatus according to the fourth embodiment.

DETAILED DESCRIPTION

Figure 1:
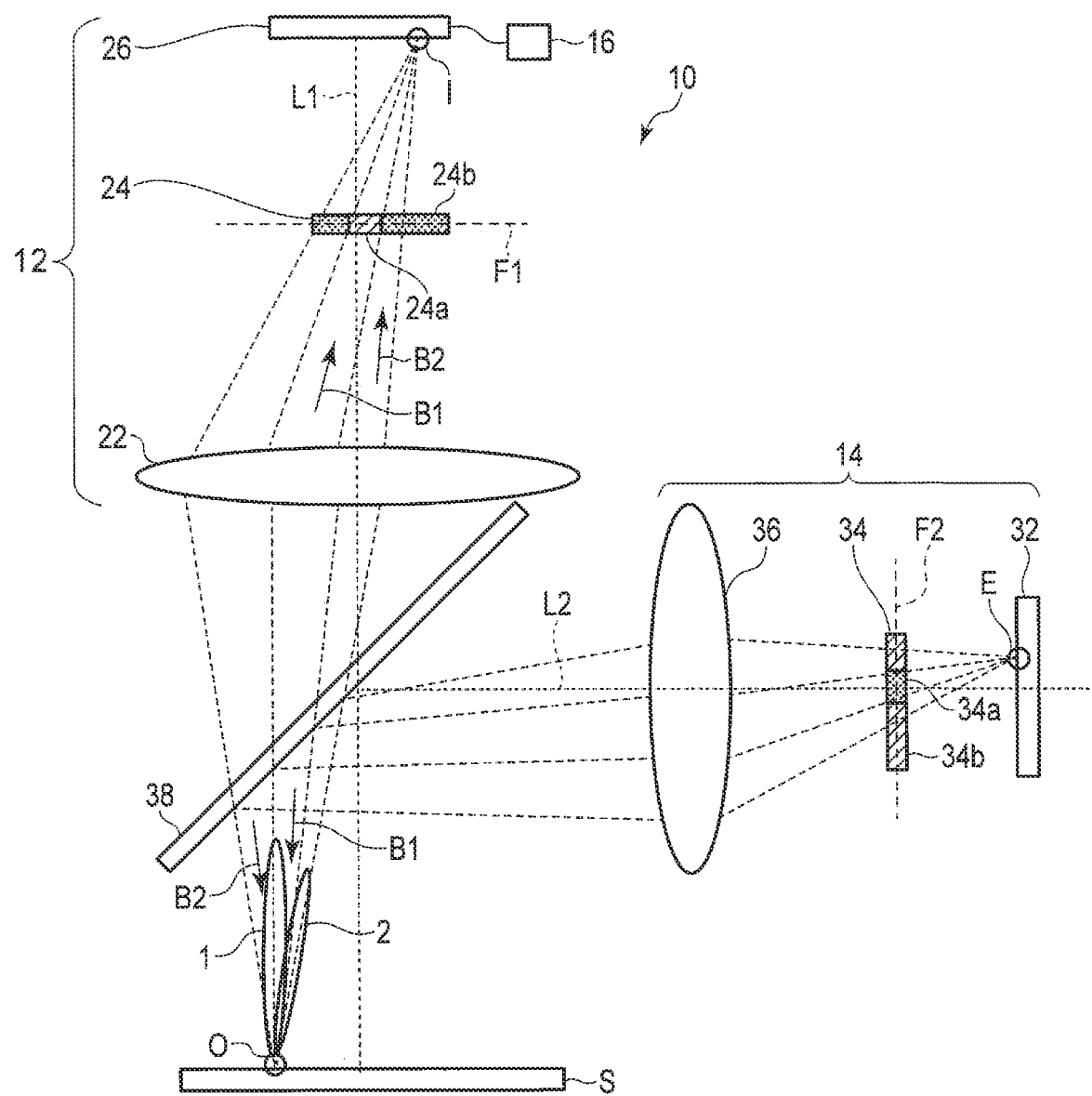
FIG. 1 is a schematic sectional view showing the operation principle of an optical inspection apparatus according to the first embodiment.

It is an object of an embodiment to provide an optical inspection apparatus capable of increasing the accuracy of optical inspection of a surface of a subject, a processing device, an optical inspection method, and a non-transitory storage medium storing an optical inspection program.

According to the embodiment, an optical inspection apparatus includes an imaging portion, a first wavelength selection portion, an illumination portion, and a second wavelength selection portion. The imaging portion includes an image sensor configured to capture a subject by light from the subject. The first wavelength selection portion is provided on an optical axis of the imaging portion and is configured to selectively pass a plurality of light components of predetermined wavelengths. The illumination portion is configured to illuminate the subject. The second wavelength selection portion is provided on an optical axis of the illumination portion and is configured to pass the plurality of light components of the predetermined wavelengths complementarily to the first wavelength selection portion.

Embodiments will now be described with reference to the accompanying drawings. The drawings are schematic or conceptual, and the relationship between the thickness and the width of each part, the size ratio between portions, and the like do not always match the reality. Also, even same portions may be illustrated in different sizes or ratios depending on the drawing. In the present specification and the drawings, the same elements as described above in already explained drawings are denoted by the same reference numerals, and a detailed description thereof will appropriately be omitted.

In this specification, light is a kind of electromagnetic wave, and includes X-rays, ultraviolet rays, visible light, infrared rays, microwaves, and the like. In this embodiment, it is assumed that the light is visible light, and for example, the wavelength is in a region of 450 nm to 700 nm.

First Embodiment

An optical inspection apparatus 10 according to this embodiment will be described in detail with reference to FIGS. 1 to 5.

FIG. 1 is a schematic sectional view of the optical inspection apparatus 10 according to this embodiment.

The optical inspection apparatus 10 according to this embodiment includes an imaging portion 12 and an illumination portion 14.

The imaging portion 12 includes an imaging optical element (first imaging optical element) 22, and an image sensor (to be also referred to as a sensor) 26 configured to capture a subject S by light from the subject S. The imaging portion 12 is provided with a first wavelength selection portion 24 that selectively passes a plurality of light components of predetermined wavelengths. The illumination portion 14 includes a light source 32, and an illumination lens (second imaging optical element) 36. The illumination portion 14 is provided with a second wavelength selection portion 34 that selectively passes a plurality of light components of predetermined wavelengths.

The imaging optical element 22 is, for example, an imaging lens. In FIG. 1, the imaging lens is schematically drawn and represented by one lens but may be a lens set formed by a plurality of lenses. Alternatively, the imaging optical element 22 may be a concave mirror, a convex mirror, or a combination thereof. That is, any optical element having a function of collecting, to a conjugate image point, a light beam group exiting from one point of an object, that is, an object point can be used as the imaging optical element 22. Collecting (condensing) a light beam group exiting from an object point on an object surface to an image point by the imaging optical element is called imaging. This is also expressed as transferring an object point to an image point (the conjugate point of the object point). In addition, the aggregate plane of conjugate points to which a light beam group exiting from a sufficiently apart object point is transferred by the imaging optical element will be referred to as the focal plane of the imaging optical element. A line that is perpendicular to the focal plane and passes through the center of the imaging element is defined as an optical axis L1 of the imaging portion 12. At this time, the conjugate image point of the object point transferred by the light beam will be referred to as a focal point.

The first wavelength selection portion 24 is arranged on the optical axis L1. The first wavelength selection portion 24 is arranged on or near a first focal plane F1 of the imaging optical element 22. When the first wavelength selection portion 24 is arranged on the focal plane F1 of the imaging optical element 22, coloring according to the direction of the light beam is possible (see Hiroshi Ohno and Takahiro Kamikawa, "One-shot BRDF imaging system to obtain surface properties," Optical Review volume 28, pages 655-661 (2021).).

The first wavelength selection portion 24 includes at least two wavelength selection regions 24a and 24b. The two wavelength selection regions are the (1-1)th wavelength selection region 24a and the (1-2)th wavelength selection region 24b. The (1-2)th wavelength selection region 24b passes a light beam having a first wavelength. Here, passing a light beam means making the light beam headed from the object point to the image point by transmission or reflection. In this embodiment, it is assumed that the (1-2)th wavelength selection region 24b passes the light beam of the first wavelength. On the other hand, the (1-2)th wavelength selection region 24b substantially shields a light beam of a second wavelength. Here, shielding means not to cause the light beam to pass. That is, this means not to make the light beam headed from the object point to the image point. However, shielding also includes a case where the intensity of the light beam is greatly decreased, and a small number of remaining components are passed. The (1-1)th wavelength selection region 24a passes the light beam having the second wavelength. In this embodiment, it is assumed that the (1-1)th wavelength selection region 24a passes the light beam of the second wavelength. On the other hand, the (1-1)th wavelength selection region 24a substantially shields the light beam of the first wavelength. For example, the first wavelength is red light with a wavelength of 650 nm, and the second wavelength is blue light with a wavelength of 450 nm. However, the present invention is not limited to this, and any wavelengths can be used.

The image sensor (to be also referred to as a sensor in short) 26 can capture the subject S by light from the subject S. The image sensor 26 includes one or more pixels, and each pixel can receive light beams of at least two different wavelengths, that is, the light beam of the first wavelength and the light beam of the second wavelength. However, the two different wavelengths need not always be identifiable. That is, the sensor 26 can be a monochrome sensor. A plane including the region where the sensor 26 is arranged is the image plane of the imaging optical element. The sensor 26 can be either an area sensor or a line sensor. The area sensor is a sensor in which pixels are arrayed in an area on the same surface. The line sensor is a sensor in which pixels are linearly arrayed. Each pixel may include three color channels of R, G, and B. However, the sensor may be a monochrome sensor with one channel. In this embodiment, the sensor 26 is an area sensor in which each pixel can receive two, red and blue light components. That is, each pixel can receive blue light with a wavelength of 450 nm and red light with a wavelength of 650 nm.

As the light source 32, for example, a surface emission type LED is used. However, the light source 32 is not limited to this, and any light source that emits light can be used. The light source 32 may be, for example, a surface emission type OLED, a xenon lamp or a halogen lamp combined with a diffusion plate, an X-ray source, or an infrared ray source.

The second wavelength selection portion 34 is arranged on an optical axis L2. The second wavelength selection portion 34 includes at least two wavelength selection regions 34a and 34b. The two wavelength selection regions are the (2-1)th wavelength selection region 34a and the (2-2)th wavelength selection region 34b. The (2-1)th wavelength selection region 34a passes a light beam having a first wavelength. Here, passing a light beam means making the light beam headed from the object point to the image point by transmission or reflection. On the other hand, the (2-1)th wavelength selection region 34a substantially shields a light beam of a second wavelength. Here, shielding means not to cause the light beam to pass. That is, this means not to make the light beam headed from the object point to the image point. The (2-2)th wavelength selection region 34b passes a wavelength spectrum including the light beam of the second wavelength. On the other hand, the (2-2)th wavelength selection region 34b substantially shields the light beam of the first wavelength.

The illumination lens 36 is, for example, an imaging lens. In FIG. 1, the illumination lens 36 is schematically drawn and represented by one lens but may be a lens set formed by a plurality of lenses. Alternatively, the illumination lens 36 may be a concave mirror, a convex mirror, or a combination thereof. That is, any optical element having a function of collecting, to a conjugate image point, a light beam group exiting from one point of an object, that is, an object point can be used as the illumination lens 36. Collecting (condensing) a light beam group exiting from an object point on an object surface to an image point by the illumination lens 36 is called imaging. This is also expressed as transferring an object point to an image point (the conjugate point of the object point). In addition, the aggregate plane of conjugate points to which a light beam group exiting from a sufficiently apart object point is transferred by the illumination lens 36 will be referred to as the focal plane of the illumination lens (imaging optical element) 36. A line that is perpendicular to the focal plane and passes through the center of the illumination lens 36 is defined as the optical axis L2 of the illumination portion 14. At this time, the conjugate image point of the object point transferred by the light beam will be referred to as a focal point. The second wavelength selection portion 34 is arranged on or near a second focal plane F2 of the illumination lens 36.

When the second wavelength selection portion 34 is thus arranged on the focal plane F2 of the illumination lens 36, light can be colored (extracted) in accordance with the direction of the light beam (see Hiroshi Ohno and Takahiro Kamikawa, "One-shot BRDF imaging system to obtain surface properties," Optical Review volume 28, pages 655-661 (2021).). That is, when the light from the light source 32 passes through the second wavelength selection portion 34, the wavelength spectrum of the light changes in accordance with the direction of the light beam.

In this embodiment, light from a light emitting point E of the light source 32 passes through the second wavelength selection portion 34, propagates along the optical axis L2 of the illumination lens 36, and forms an image at an object point O on the surface of the subject S via a beam splitter 38. Here, it can be considered that the optical axis L2 of the illumination portion 14 is bent via the beam splitter 38.

The distribution of directions of reflected light beams from the object point O on the surface of the object S can be represented by a distribution function called BRDF (Bidirectional Reflectance Distribution Function). The BRDF changes depending on the surface properties/shape in general. That is, the BRDF changes depending on the surface state of an object surface. For example, if the surface is rough, reflected light spreads in various directions. Hence, the BRDF represents a wide distribution. That is, the reflected light exists in a wide angle. On the other hand, if the surface is a mirror surface, reflected light includes almost only specular reflection components, and the BRDF represents a narrow distribution. As described above, the BRDF reflects the surface properties/shape of the object surface. Here, the surface properties/shape may be a surface roughness, fine unevenness on a micron order, tilt of the surface, or distortion or the like. That is, any properties concerning the height distribution of the surface can be used. If the surface properties/shape is formed by a fine structure, the typical structure scale can be any scale such as a nano-scale, micron-scale, or a milli-scale.

Figure 2:
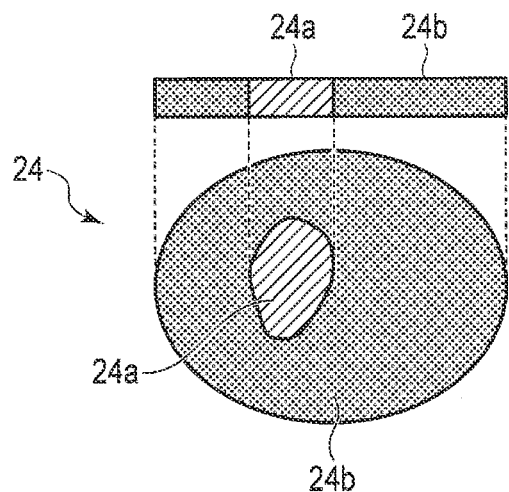
FIG. 2 is a schematic view showing the first wavelength selection portion of the optical inspection apparatus shown in FIG. 1.
Figure 3:
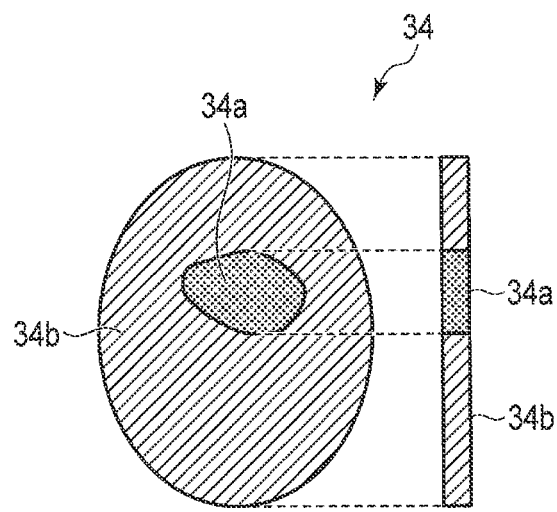
FIG. 3 is a schematic view showing the second wavelength selection portion of the optical inspection apparatus shown in FIG. 1.

The first wavelength selection portion 24 shown in FIG. 2 and the second wavelength selection portion 34 shown in FIG. 3 have complementarity. That is, these have at least a correlation relationship. Here, if the first wavelength selection portion 24 and the second wavelength selection portion 34 have complementarity, these have the following two features.

As the first feature, the first wavelength selection portion 24 and the second wavelength selection portion 34 have similar shapes. Here, the whole regions of the first wavelength selection portion 24 and the second wavelength selection portion 34 need not be similar to each other. For example, the first wavelength selection portion 24 and the second wavelength selection portion 34 can have any whole size or outer edge shape. That is, it is only necessary that in the first wavelength selection portion 24 and the second wavelength selection portion 34, the regions where the light beams used for imaging pass are similar to each other.

Here, a sectional view of the first wavelength selection portion 24 in FIG. 1 corresponds to the upper view of FIG. 2. Also, a cross section of the first wavelength selection portion 24 along a plane orthogonal to the optical axis L1 corresponds to the lower view of FIG. 2. A sectional view of the second wavelength selection portion 34 in FIG. 1 corresponds to the right view of FIG. 3. Also, a cross section of the second wavelength selection portion 34 along a plane orthogonal to the optical axis L2 corresponds to the left view of FIG. 3. The sectional view of the first wavelength selection portion 24 along the plane orthogonal to the optical axis L1 and the sectional view of the second wavelength selection portion 34 along the plane orthogonal to the optical axis L2 have similar shapes. That is, the (1-1)th wavelength selection region 24a of the first wavelength selection portion 24 and the (2-1)th wavelength selection region 34a of the second wavelength selection portion 34 have similar shapes. Similarly, the (1-2)th wavelength selection region 24b of the first wavelength selection portion 24 and the (2-2)th wavelength selection region 34b of the second wavelength selection portion 34 have similar shapes. However, even in or near the regions where the light beams used for imaging pass, the first wavelength selection portion 24 and the second wavelength selection portion 34 may have shapes different from each other if locally. This will be explained in an embodiment to be described later (see FIG. 14). For example, the second wavelength selection portion 34 may include a wavelength shielding portion 35. Also, the first wavelength selection portion 24 may include a similar shielding portion in addition to or in place of the wavelength shielding portion 35.

As the second feature, the wavelength selection regions 24a and 24b of the first wavelength selection portion 24 and the wavelength selection regions 34a and 34b of the second wavelength selection portion 34 have a relationship complementary to the passing wavelength regions. That is, these have a correlation relationship with each other at least for the passing wavelength regions. The wavelength regions of the light beams passing through the (1-1)th wavelength selection region 24a and the (2-1)th wavelength selection region 34a are different from each other, and the wavelength regions of the light beams passing through the (1-2)th wavelength selection region 24b and the (2-2)th wavelength selection region 34b are different from each other. On the other hand, the (1-1)th wavelength selection region 24a and the (2-2)th wavelength selection region 34b have a common passing wavelength region as a wavelength region to pass the light beams, and the (1-2)th wavelength selection region 24b and the (2-1)th wavelength selection region 34a similarly have a common passing wavelength region as a wavelength region to pass the light beams.

That is, there is such a relationship that the light beam of the wavelength that has passed through the (2-1)th wavelength selection region 34a is shielded by the (1-1)th wavelength selection region 24a. There is also such a relationship that the light beam of the wavelength that has passed through the (2-1)th wavelength selection region 34a passes through the (1-2)th wavelength selection region 24b. There is also such a relationship that the light beam of the wavelength that has passed through the (2-2)th wavelength selection region 34b is shielded by the (1-2)th wavelength selection region 24b. There is also such a relationship that the light beam of the wavelength that has passed through the (2-2)th wavelength selection region 34b passes through the (1-1)th wavelength selection region 24a.

The first wavelength selection portion 24 and the second wavelength selection portion 34 have similar shapes. The similarity ratio is determined by the ratio of the focal length of the imaging optical element 22 and the focal length of the illumination lens 36. For example, if the focal length of the imaging optical element 22 is 100 mm, and the focal length of the illumination lens 36 is 50 mm, the similarity ratio is two-fold. That is, the first wavelength selection portion 24 is obtained by two-fold similar enlargement of the second wavelength selection portion 34.

As described above, that the first wavelength selection portion 24 and the second wavelength selection portion 34 have a similarity relationship that these have similar shapes on predetermined cross sections, and also have a relationship concerning passing/shielding of a plurality of predetermined wavelengths in the regions of these means that the first wavelength selection portion 24 and the second wavelength selection portion 34 have complementarity.

A processing device 16 is formed by, for example, a computer, and includes a processor (processing circuit) and a non-transitory storage medium. The processor includes one of a CPU (Central Processing Unit), an ASIC (Application Specific Integrated Circuit), a microcomputer, an FPGA (Field Programmable Gate Array), and a DSP (Digital Signal Processor). In addition to a main storage device such as a memory, the non-transitory storage medium can include an auxiliary storage device. As the non-transitory storage medium, a nonvolatile memory capable of writing and reading as needed, such as an HDD (Hard Disk Drive), an SSD (Solid State Drive), a magnetic disk, an optical disk (a CD-ROM, a CD-R, a DVD, or the like), a magnetooptical disk (an MO or the like), a semiconductor memory, or the like can be used.

In the processing device 16, only one processor and one storage medium may be provided, or a plurality of processors and a plurality of storage media may be provided. In the processing device 16, the processor executes a program and the like stored in the non-transitory storage medium, thereby performing processing. The program executed by the processor of the processing device 16 may be stored in a computer (server) connected to the processing device 16 via a network such as the Internet, or a server in a cloud environment. In this case, the processor downloads the program via the network. In the processing device 16, image acquisition from the image sensor 26 and various kinds of calculation processing based on the image acquired from the image sensor 26 are executed by the processor and the like, and the non-transitory storage medium functions as a data storage unit.

In addition, at least part of the processing of the processing device 16 may be executed by a cloud server constituted in a cloud environment. The infrastructure of the cloud environment is formed by a virtual processor such as a virtual CPU and a cloud memory. In an example, image acquisition from the image sensor 26 and various kinds of calculation processing based on the image acquired from the image sensor 26 are executed by the virtual processor, and the cloud memory functions as a data storage unit.

Note that in this embodiment, the processing device 16 controls the image sensor 26. Also, the processing device 16 controls the light source 32.

Under the above-described configuration, the operation principle of the optical inspection apparatus 10 according to this embodiment will be described with reference to FIGS. 1, 4, and 5.

The processing device 16 causes the light source 32 of the illumination portion 14 to emit light, and the image sensor 26 captures an image (step S101).

Light from the light emitting point E of the light source 32 passes through the second wavelength selection portion 34, propagates along the optical axis L2 of the illumination lens 36, and forms an image at the object point O of the surface of the subject S via the beam splitter 38. Here, for example, a first light beam B1 is emitted from the light emitting point E of the light source 32, passes through the (2-1)th wavelength selection region 34a of the second wavelength selection portion 34, passes through the illumination lens 36 as red light including the first wavelength, is reflected by the beam splitter 38, and reaches the object point O of the subject S. Also, a second light beam B2 is emitted from the light emitting point E of the light source 32, passes through the (2-2)th wavelength selection region 34b of the second wavelength selection portion 34, passes through the illumination lens 36 as blue light including the second wavelength, is reflected by the beam splitter 38, and reaches the object point O of the subject S.

Note that the (2-1)th wavelength selection region 34a of the second wavelength selection portion 34 shields light of the second wavelength different from the first wavelength. For this reason, blue light including the second wavelength is shielded by the (2-1)th wavelength selection region 34a of the second wavelength selection portion 34. The (2-2)th wavelength selection region 34b of the second wavelength selection portion 34 shields light of the first wavelength different from the second wavelength. For this reason, red light including the first wavelength is shielded by the (2-2)th wavelength selection region 34b of the second wavelength selection portion 34.

In FIG. 1, the standard surface of the subject S is, for example, substantially a mirror surface. This will be referred to as a standard surface. At this time, a light beam that enters the object point O of the subject S is almost specularly reflected. That is, the BRDF at the object point O includes the almost specular reflection component as the main component, and has a narrow direction distribution. On the other hand, if an uneven defect C in a micron size exists at the object point O, as shown in FIG. 4, the BRDF at the object point O has a wide distribution. However, the uneven portion in the micron size may be defined as the standard surface, and the mirror surface may be defined as the defect. That is, what kind of surface is defined as the standard surface can arbitrary be determined.

As shown in FIG. 1, of the light reflected at the object point O of the surface of the subject S, the specular reflection component is reflected in the specular reflection direction and directed to the imaging optical element (imaging lens) 22. For example, if the first light beam B1 is reflected at the object point O, the direction distribution of the reflected light of the first light beam B1 can be represented by a first BRDF denoted by reference numeral 1. Of the reflected light that can be represented by the first BRDF 1, the specular reflection component passes through the beam splitter 38, passes through the imaging optical element 22, and is shielded by the (1-1)th wavelength selection region 24a of the first wavelength selection portion 24. At this time, if the first wavelength selection portion 24 does not exist, the specular reflection component of the reflected light that can be represented by the first BRDF 1 reaches an image point I on the image sensor 26.

Also, if the second light beam B2 is reflected at the object point O, the direction distribution of the reflected light of the second light beam B2 can be represented by a second BRDF denoted by reference numeral 2. Of the reflected light that can be represented by the second BRDF 2, the specular reflection component passes through the beam splitter 38, passes through the imaging optical element (imaging lens) 22, and is shielded by the (1-2)th wavelength selection region 24b of the first wavelength selection portion 24. At this time, if the first wavelength selection portion 24 does not exist, the specular reflection component of the reflected light that can be represented by the second BRDF 2 reaches the image point I on the image sensor 26.

As described above, since the first wavelength selection portion 24 and the second wavelength selection portion 34 have complementarity, the specular reflection component of the light reflected at the object point O of the surface of the subject S (the first light beam B1 and the second light beam B2) is shielded without reaching the image sensor 26. That is, the image acquired by the image sensor 26 is an image that is black as a whole, that is, the pixel values of the entire image are substantially 0. This means that the light emitted by the light source 32 is not received by the image sensor 26.

Since the surface of the subject S is substantially a mirror surface, and the light beam that has entered the object point O is almost specularly reflected, each of the first BRDF 1 and the second BRDF 2 substantially mainly includes the specular reflection component, and the reflected light is substantially shielded by the first wavelength selection portion 24. That is, the image acquired by the image sensor 26 is an image that is black as a whole, that is, the pixel values of the entire image are substantially 0.

Figure 4:
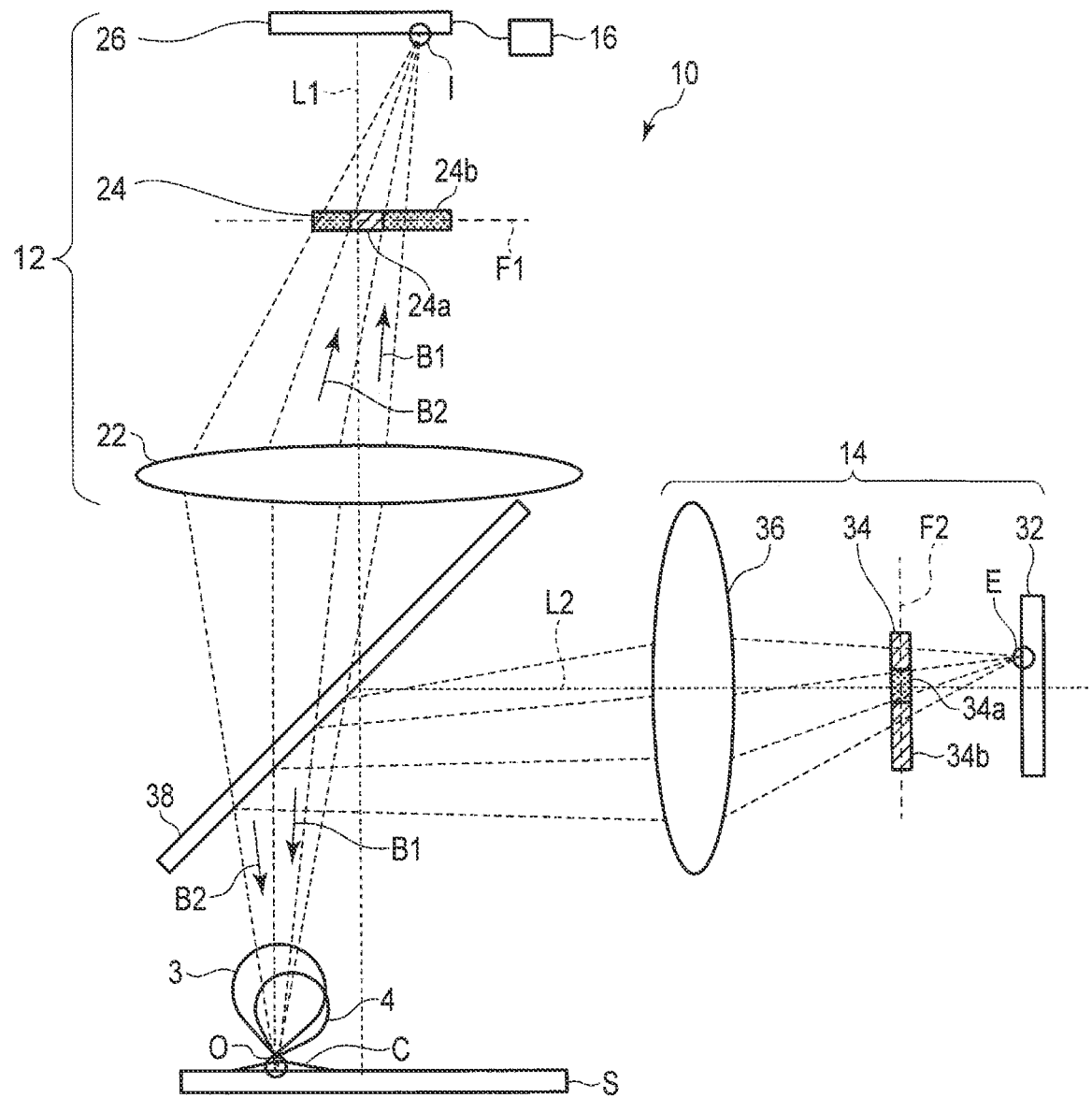
FIG. 4 is a schematic sectional view showing the operation principle of the optical inspection apparatus according to the first embodiment.
Figure 5:
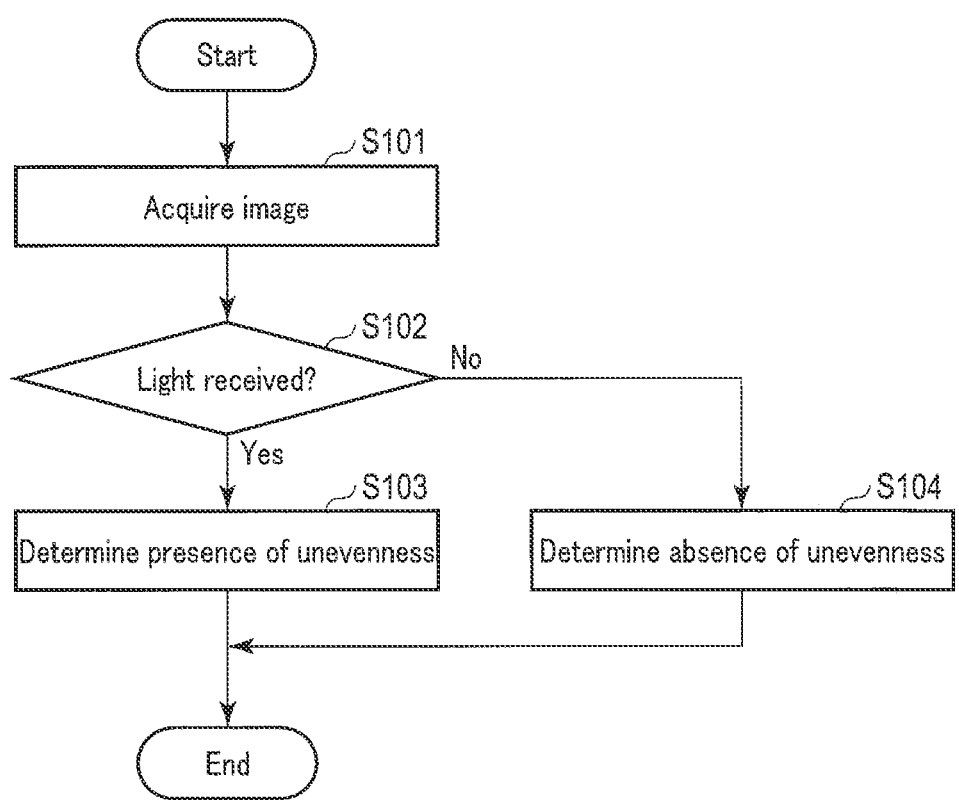
FIG. 5 is a schematic flowchart showing the processing procedure of the processing device of the optical inspection apparatus shown in FIGS. 1, 2, 3, and 4.

On the other hand, if the unevenness C exists at the object point O of the subject S, as shown in FIG. 4, the BRDF at the object point O represents a wide distribution as compared to the mirror-like surface that is the standard surface. That is, the first light beam B1 is reflected at the object point O, and changes to, for example, reflected light that can be represented by a third BRDF denoted by reference numeral 3, and the second light beam B2 is reflected at the object point O, and changes to, for example, reflected light that can be represented by a fourth BRDF denoted by reference numeral 4. In this case, in the first light beam B1, a component that is reflected at the object point O, passes through the beam splitter 38 and the imaging optical element 22, and reaches the (1-2)th wavelength selection region 24b in addition to the (1-1)th wavelength selection region 24a of the first wavelength selection portion 24 is generated. The (1-2)th wavelength selection region 24b passes the first light beam B1. The (component of the) first light beam B1 that has passed through the first wavelength selection portion 24 reaches the image point I on the image sensor 26. Hence, the first wavelength is received at the image point I. That is, the sensor 26 receives red light.

Similarly, in the second light beam B2, a component that is reflected at the object point O, passes through the beam splitter 38 and the imaging optical element 22, and reaches the (1-1)th wavelength selection region 24a in addition to the (1-2)th wavelength selection region 24b of the first wavelength selection portion 24 is generated. The (1-1)th wavelength selection region 24a passes the second light beam B2. The (component of the) second light beam B2 that has passed through the first wavelength selection portion 24 reaches the image point I on the image sensor 26. Hence, the second wavelength is received at the image point I. That is, the sensor 26 receives blue light.

As described above, the sensor 26 simultaneously receives the first wavelength and the second wavelength for the object point O with the unevenness C, like the subject S shown in FIG. 4. On the other hand, at the image point I corresponding to the object point O on the standard surface without the unevenness C, like the subject S shown in FIG. 1, the sensor 26 receives neither light components.

Concerning the image acquired by the image sensor 26, the processing device 16 judges whether the light from the surface of the subject S is received (step S102).

If the light from the surface of the subject S is received by the image sensor 26 (YES in step S102), the processing device 16 determines that the unevenness C exists on the surface of the subject S (step S103). If the light from the surface of the subject S is not received by the image sensor 26 (NO in step S102), the processing device 16 determines that the unevenness C does not exist on the surface of the subject S (step S104).

That is, the processing device (processor) 16 detects the presence/absence of reception of reflected light from the subject S in each pixel of the image sensor 26. Upon detecting the absence of light reception in each pixel of the image sensor 26, the processing device (processor) 16 that the surface of the subject S for the image point I corresponding to each pixel is the standard surface. Upon detecting the presence of light reception, the processing device 16 outputs that the surface of the subject S for the image point I is different from the standard surface. Hence, in each pixel of the image sensor 26, the processing device 16 outputs the difference between the standard surface and the surface at the object point O corresponding to the pixel based on the detection result of the presence/absence of light reception. That is, in each pixel of the image sensor 26, if the detection result indicates the absence of light reception, the processing device 16 outputs that the object point O of the subject S corresponding to the pixel is on the standard surface. If the detection result indicates the presence of light reception, the processing device 16 outputs that the object point O on the surface of the subject S corresponding to the pixel is on a surface different from the standard surface.

This allows the processing device 16 to identify the presence/absence of the unevenness C on the subject S from the image acquired by the image sensor 26. If the unevenness C exists on the subject S, the sensor 26 can receive not only the light of the first wavelength but also the light of the second wavelength at the same time. For this reason, the S/N ratio of the light received by the sensor 26 can be increased. On the other hand, if the sensor 26 receives only the first wavelength (red light) or only the second wavelength (blue light), the light amount decreases as compared to a case where both the first wavelength and the second wavelength are received. Hence, the S/N ratio lowers as compared to the case where both are received. That is, in all pixels of the image captured by the image sensor 26, the processing device 16 obtains dark black at a position where no light is received and a bright color that is a mixture of red light and blue light at a position where light is received. For this reason, the processing device 16 can output positions where the unevenness C exists and positions where the unevenness C does not exist with a clear contrast. That is, these can be expressed with a clear contrast not only by brightness but also by different colors.

In this embodiment, an example in which two different wavelengths, that tis, the first wavelength and the second wavelength are used, has been described. Note that the image sensor 26 functions even without discrimination between the two wavelengths. That is, substantially, the processing device 16 can judge that the unevenness C does not exist at the object point O on the subject S for which the pixel value at the image point I is 0, and that the unevenness C exists at a position where the pixel value is larger than 0. Hence, the sensor 26 can use a monochrome sensor. Also, since the sensor 26 may use a color sensor, the range of choice for usable image sensors can be expanded.

Also, in this embodiment, the standard surface is a mirror surface. However, the standard surface may be an uneven surface. In this case as well, since the BRDF on the standard surface and the BRDF on a surface are different from each other, two complementary wavelength selection portions can similarly be made to function by appropriately adjusting these. Hence, in each pixel of the image sensor 26, the processing device 16 outputs the difference between the standard surface and the surface at the object point O corresponding to the pixel based on the detection result of the presence/absence of light reception. That is, in each pixel of the image sensor 26, if the detection result indicates the absence of light reception, the processing device 16 outputs that the object point O of the subject S corresponding to the pixel is on a surface different from the standard surface. If the detection result indicates the presence of light reception, the processing device 16 outputs that the object point O on the surface of the subject S corresponding to the pixel is on the standard surface. The presence/absence of light reception in each pixel of the image sensor 26 and whether the object point is on the standard surface can appropriately be set.

In this embodiment, the imaging optical element 22 and the illumination lens 36 can be made common. That is, one imaging optical element 22 may be used as the illumination lens 36. In this case, the beam splitter 38 is arranged on a side closer to the image sensor 26 than the imaging optical element 22. In this case, since the imaging optical element 22 and the illumination lens 36 are common (single), focal lengths thereof equal.

In this embodiment, the ratio of the total area of the light receiving surface of the image sensor 26 to the total area of the light emitting surface of the light source 32 can be adjusted by the focal length of the imaging optical element 22 or the illumination lens 36. That is, for example, the area of the image sensor 26 can be adjusted by adjusting the position of the imaging optical element 22 or the illumination lens 36 with respect to the light source 32 having an arbitrary light emitting surface.

Also, the beam splitter 38 may be a polarization beam splitter 38. In this case, only a component whose direction of polarization is rotated by scattering from the surface of the subject S is received by the image sensor 26. This can increase the sensitivity to scattering.

The first wavelength selection portion 24 according to this embodiment is provided in the optical path between the subject S and the imaging portion 12 on the optical axis L1 of the imaging portion 12, and selectively passes a plurality of light components of predetermined wavelengths. The second wavelength selection portion 34 is provided in the optical path between the illumination portion 14 (light source 32) and the subject S on the optical axis L2 of the illumination portion 14, and selectively passes a plurality of light components of predetermined wavelengths in a state with complementarity to the first wavelength selection portion 24. Hence, if the image sensor 26 of the imaging portion 12 receives light from the surface of the subject S, the optical inspection apparatus 10 detects the presence of the unevenness C on the surface of the subject S. If the image sensor 26 of the imaging portion 12 does not receive light from the surface of the subject S, the optical inspection apparatus 10 detects the absence of the unevenness C on the surface of the subject S. The surface state of the subject S can be judged based on the presence/absence of light reception, and the accuracy of optical inspection of the surface of the subject S can be increased. Hence, according to this embodiment, it is possible to provide the optical inspection apparatus 10 capable of increasing the accuracy of optical inspection of the surface of the subject S, the processing device 16, an optical inspection method, and a non-transitory storage medium storing an optical inspection program.

Modification

If a color sensor is used as the image sensor 26 in place of a monochrome sensor, the image sensor 26 can identify blue light and red light in each pixel. In this case, for example, if the uneven portion C exists at the object point O, and the image sensor 26 receives only blue light that is the second light beam, this means that the BRDF of red light that is the first light beam and the BRDF of blue light that is the second light beam are different. In this case, it means that the distribution of the BRDF of blue light that is the second light beam is wider than the distribution of the BRDF of red light that is the first light beam. That is, the incidence angle dependence of the BRDF can be grasped. Since this makes it possible to acquire more detailed BRDF information, more accurate optical inspection can be performed.

Figure 6:
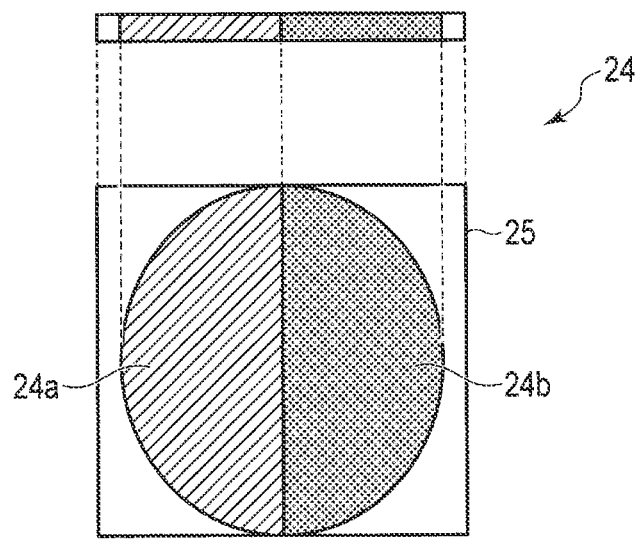
FIG. 6 is a schematic view showing a modification of the first wavelength selection portion (and the second wavelength selection portion) used in the optical inspection apparatus according to the first embodiment.

As the first wavelength selection portion 24 and the second wavelength selection portion 34, various units can be used. For example, the first wavelength selection portion 24 and the second wavelength selection portion 34 impart anisotropy around the optical axes L1 and L2 of the optical inspection apparatus 10, thereby identifying the direction of the tilt of the surface of the subject S. In this case, the image sensor 26 is a color sensor capable of identifying at least two different colors. It is assumed here that the image sensor 26 can identify the first wavelength (red) and the second wavelength (blue). For example, as shown in FIG. 6, the (1-1)th wavelength selection region 24a and the (1-2)th wavelength selection region 24b are provided as the first wavelength selection portion 24. The second wavelength selection portion 34 has complementarity to the (1-1)th wavelength selection region 24a and the (1-2)th wavelength selection region 24b of the first wavelength selection portion 24, and these are the (2-1)th wavelength selection region 34a and the (2-2)th wavelength selection region 34b. In addition, the first wavelength selection portion 24 includes a wavelength shielding portion 25 around the (1-1)th wavelength selection region 24a and the (1-2)th wavelength selection region 24b. The wavelength shielding portion 25 shields all light beams emitted from the light source 32.

Note that in FIG. 6, each of the (1-1)th wavelength selection region 24a and the (1-2)th wavelength selection region 24b of the first wavelength selection portion 24 has a semicircular shape, and when the (1-1)th wavelength selection region 24a and the (1-2)th wavelength selection region 24b are combined, a circular shape is obtained. Although not illustrated, the (2-1)th wavelength selection region 34a of the second wavelength selection portion 34 has a semicircular shape, like the (1-1)th wavelength selection region 24a of the first wavelength selection portion 24, and the (2-2)th wavelength selection region 34b of the second wavelength selection portion 34 has a semicircular shape, like the (1-2)th wavelength selection region 24b of the first wavelength selection portion 24. The direction to arrange these adjacently is the same directions along the optical axes L1 and L2.

Figure 7:
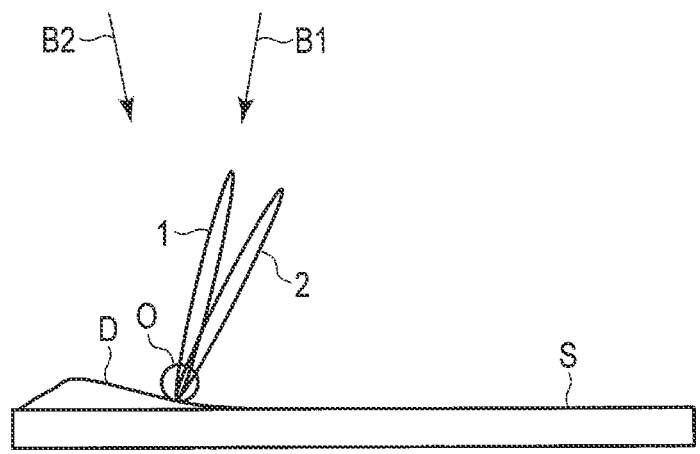
FIG. 7 is a schematic sectional view showing the operation principle when performing optical inspection using the first wavelength selection portion (and the second wavelength selection portion) shown in FIG. 6.

At this time, if the surface of the subject S has a tilt D, as shown in FIG. 7, the first BRDF 1 and the second BRDF 2 also tilt in the same direction. Accordingly, the first light beam B1 reaches the (1-2)th wavelength selection region 24b of the first wavelength selection portion 24 and the wavelength shielding portion 25, and passes the (1-2)th wavelength selection region 24b. For this reason, the image sensor 26 receives the first wavelength by the red channel. On the other hand, the second light beam B2 reaches the (1-2)th wavelength selection region 24b of the first wavelength selection portion 24 and the wavelength shielding portion 25 and is shielded there. That is, the image sensor 26 does not receive the light of the second wavelength. For this reason, the signal (pixel value) of the blue channel is 0. Assume that the direction of the tilt D at the object point O is reverse to that shown in FIG. 7. In this case, only the blue light that is the light of the second wavelength is received by the image sensor 26 by the same mechanism. Thus, when the color image sensor 26 and the first wavelength selection portion 24 that imparts anisotropy around the optical axis L1 are used, the direction of the tilt can be estimated by identifying whether blue light is received or red light is received. That is, if reflected light from the subject S is received in at least one pixel of the image sensor 26, the processing device (processor) 16 identifies the tilting direction of the surface at the object point O corresponding to the pixel based on the color of the received light.

Each of the wavelength selection portions 24 and 34 is suitably supported by, for example, a support portion. The support portions can individually or synchronously rotate the wavelength selection portions 24 and 34 by, for example, an equal angle. Even if the BRDF has special anisotropy, an accurate BRDF distribution can be acquired, by capturing an image by the image sensor 26 while rotating the wavelength selection portions 24 and 34.

When the first wavelength selection portion 24 and the second wavelength selection portion 34, which maintain a complementary relationship, are rotated about the optical axes L1 and L2 by an appropriate angle, for example, 45°, and an image is acquired, the direction of the tilt D at the object point O of the subject S can be estimated.

Thus, when the color image sensor 26 and the first wavelength selection portion 24 that imparts anisotropy around the optical axis L1 are used, the direction of the tilt of the surface of the subject S can be estimated by identifying whether blue light is received or red light is received.

According to this modification, it is possible to provide the optical inspection apparatus 10 capable of increasing the accuracy of optical inspection of the surface of the subject S, the processing device 16, an optical inspection method, and a non-transitory storage medium storing an optical inspection program.

(Examples of Wavelength Selection Portions)

FIGS. 8 to 12 shows various shapes of the first wavelength selection portion 24. The wavelength selection portion 24 can be optimized in accordance with the sensitivity necessary for optical inspection. Although not illustrated, as the second wavelength selection portion 34, a portion that maintains the complementary relationship with the first wavelength selection portion 24 is used.

Figure 8:
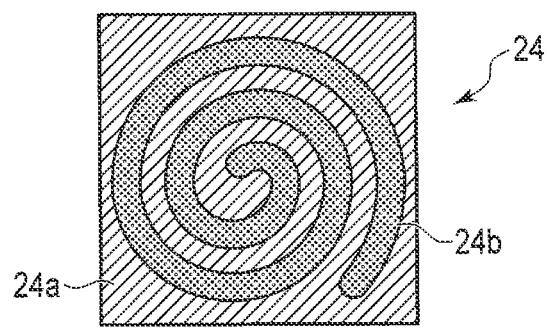
FIG. 8 is a schematic view showing an example of the first wavelength selection portion (and the second wavelength selection portion) used in the optical inspection apparatus according to the first embodiment.

The (1-1)th wavelength selection region 24a of the first wavelength selection portion 24 shown in FIG. 8 is formed at a position except a spiral, and the (1-2)th wavelength selection region 24b is formed at the position of the spiral.

Although not illustrated, the (2-1)th wavelength selection region 34a of the second wavelength selection portion 34 is formed in a shape similar to the (1-1)th wavelength selection region 24a at the position except the spiral in FIG. 8, and the (2-2)th wavelength selection region 34b is formed in a shape similar to the (1-2)th wavelength selection region 24b at the position of the spiral in FIG. 8.

Figure 9:
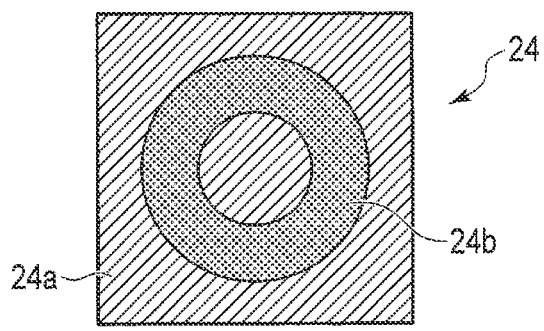
FIG. 9 is a schematic view showing an example of the first wavelength selection portion (and the second wavelength selection portion) used in the optical inspection apparatus according to the first embodiment.

The wavelength selection portion 24 shown in FIG. 9 and the wavelength selection portion 34 (not shown) are arranged in the same relationship as the wavelength selection portion 24 shown in FIG. 2 and the wavelength selection portion 34 shown in FIG. 3. In FIG. 9, the (1-1)th wavelength selection region 24a of the first wavelength selection portion 24 is formed at a position except a ring, and the (1-2)th wavelength selection region 24b is formed at the position of the ring.

Figure 10:
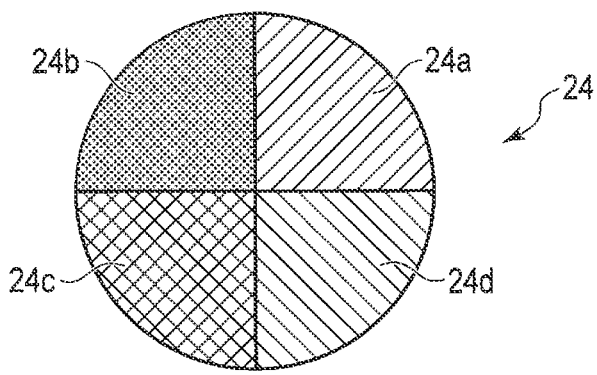
FIG. 10 is a schematic view showing an example of the first wavelength selection portion (and the second wavelength selection portion) used in the optical inspection apparatus according to the first embodiment.

The first wavelength selection portion 24 shown in FIG. 10 includes four wavelength selection regions 24a, 24b, 24c, and 24d. The wavelength selection portion 24 shown in FIG. 10 and the wavelength selection portion 34 (not shown) are arranged in the same relationship as the wavelength selection portion 24 shown in FIG. 2 and the wavelength selection portion 34 shown in FIG. 3. Although not illustrated, the second wavelength selection portion 34 includes four wavelength selection regions 34a, 34b, 34c, and 34d. Note that the first wavelength selection portion 24 shown in FIG. 10 has anisotropy. Hence, the first wavelength selection portion 24 shown in FIG. 10 can be used to detect the above-described tilting surface D (see FIG. 7).

The (1-1)th wavelength selection region 24a passes, for example, the first wavelength, and shields the second to fourth wavelengths that are different. The (1-2)th wavelength selection region 24b passes, for example, the second wavelength, and shields the first, third, and fourth wavelengths that are different. The (1-3)th wavelength selection region 24c passes, for example, the third wavelength, and shields the first, second, and fourth wavelengths that are different. The (1-4)th wavelength selection region 24d passes, for example, the fourth wavelength, and shields the first to third wavelengths that are different.

Which wavelength is to be passed and which wavelength is to be shielded by each of the wavelength selection regions 34a, 34b, 34c, and 34d of the second wavelength selection portion 34 can appropriately be set. The (2-1)th wavelength selection region 34a passes, for example, the fourth wavelength, and shields the first to third wavelengths that are different. The (2-2)th wavelength selection region 34b passes, for example, the first wavelength, and shields the second to fourth wavelengths that are different. The (2-3)th wavelength selection region 34c passes, for example, the second wavelength, and shields the first, third, and fourth wavelengths that are different. The (2-4)th wavelength selection region 34d passes, for example, the third wavelength, and shields the first, second, and fourth wavelengths that are different.

Figure 11:
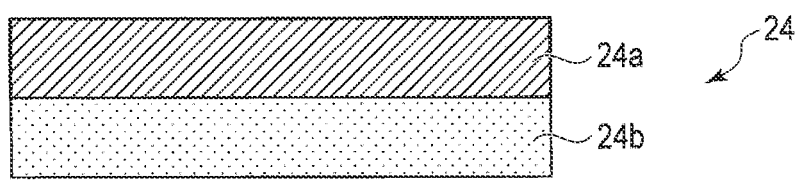
FIG. 11 is a schematic view showing an example of the first wavelength selection portion (and the second wavelength selection portion) used in the optical inspection apparatus according to the first embodiment.

The wavelength selection portion 24 shown in FIG. 11 and the wavelength selection portion 34 (not shown) are arranged in the same relationship as the wavelength selection portion 24 shown in FIG. 2 and the wavelength selection portion 34 shown in FIG. 3.

The first wavelength selection portion 24 shown in FIG. 11 includes two wavelength selection regions 24a and 24b. The wavelength selection regions 24a and 24b each have a stripe shape and are adjacent in the up-and-down direction shown in FIG. 11. Note that the first wavelength selection portion 24 shown in FIG. 11 has anisotropy. Hence, the first wavelength selection portion 24 shown in FIG. 11 can be used to detect the above-described tilting surface D.

Figure 12:
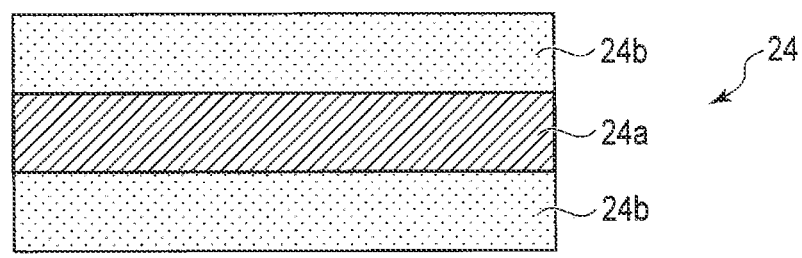
FIG. 12 is a schematic view showing an example of the first wavelength selection portion (and the second wavelength selection portion) used in the optical inspection apparatus according to the first embodiment.

The wavelength selection portion 24 shown in FIG. 12 and the wavelength selection portion 34 (not shown) are arranged in the same relationship as the wavelength selection portion 24 shown in FIG. 2 and the wavelength selection portion 34 shown in FIG. 3.

The first wavelength selection portion 24 shown in FIG. 12 includes three wavelength selection regions 24a and 24b. The (1-1)th wavelength selection region 24a is disposed between the (1-2)th wavelength selection regions 24b.

Second Embodiment

Figure 13:
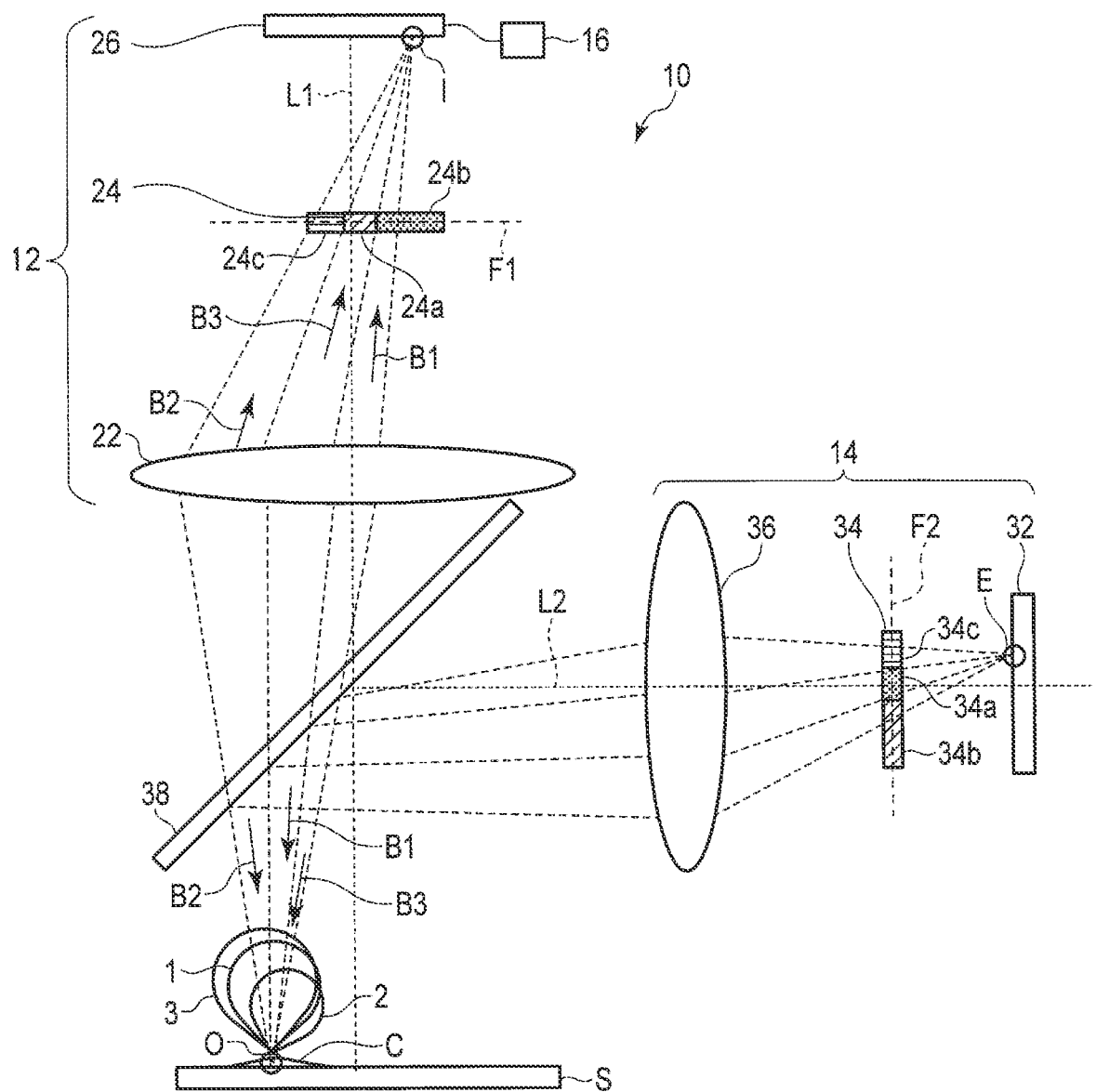
FIG. 13 is a schematic sectional view showing the operation principle of an optical inspection apparatus according to the second embodiment.

An optical inspection apparatus 10 according to this embodiment will be described in detail with reference to FIG. 13. The optical inspection apparatus 10 according to this embodiment is basically the same as the optical inspection apparatus according to the first embodiment. Differences will be described below.

In this embodiment, an image sensor 26 is not a monochrome sensor but a color sensor capable of discriminating between blue light, green light, and red light.

A first wavelength selection portion 24 and a second wavelength selection portion 34 have a complementary relationship with respect to optical axes L1 and L2. The first wavelength selection portion 24 includes a (1-1)th wavelength selection region 24a, a (1-2)th wavelength selection region 24b, and a (1-3)th wavelength selection region 24c. The wavelength spectra of light passing through the wavelength selection regions 24a, 24b, and 24c are different from each other. The second wavelength selection portion 34 includes a (2-1)th wavelength selection region 34a, a (2-2)th wavelength selection region 34b, and a (2-3)th wavelength selection region 34c. The wavelength spectra of light passing through the wavelength selection regions 34a, 34b, and 34c are different from each other.

The operation principle of the optical inspection apparatus 10 according to this embodiment will be described.

Light that is emitted from a light emitting point E on the light emitting surface of a light source 32 and passes through the (2-3)th wavelength selection region 34c changes to a third light beam B3 including a wavelength of 550 nm and becomes green light. The third light beam B3 passes through an illumination lens 36, is reflected by a beam splitter 38, and reaches an object point O. The third light beam B3 is further reflected at the object point O, changes to reflected light that can be represented by a third BRDF denoted by reference numeral 3, passes through the beam splitter 38, passes through an imaging lens 22, and reaches the first wavelength selection portion 24.

If the surface of a subject S is a mirror surface, the first light beam B1, the second light beam B2, and the third light beam B3 are shielded by the first wavelength selection portion 24. In this case, the image sensor 26 receives no light at the image point on the image sensor 26. That is, a dark image (pixel value=0) is obtained. At this time, none of blue light, red light, and green light is received at an image point I on the image sensor 26, and the number of colors of received light is 0. This is defined as the number of colors=0.

On the other hand, if unevenness C exists at the object point O, the first light beam B1, the second light beam B2, and the third light beam B3 pass through the first wavelength selection portion 24. For this reason, the image sensor 26 receives light of three colors, that is, blue light, red light, and green light at the image point I on the image sensor 26. This is defined as the number of colors=3. A processing device 16 acquires the image from the image sensor 26, and outputs the number of colors in each pixel. Hence, the processing device 16 can recognize whether, in each pixel, light has passed through the three wavelength selection regions 24a, 24b, and 24c of the first wavelength selection portion 24.

The number of colors depends on the extent of the distribution of the BRDF at the object point O. That is, the wider the distribution of the BRDF is, the larger the number of colors detected by the processing device 16 is. The narrower the distribution of the BRDF is, the smaller the number of colors detected by the processing device 16 is. In other words, it is considered that the larger the number of colors is, the wider the scattered light distribution (BRDF) is, and the smaller the number of colors is, the narrower the scattered light distribution (BRDF) is. Hence, if the number of colors at each image point I can be acquired by color count estimation processing of the processing device 16, the difference of the BRDF at each object point O can be identified. That is, the processing device (processor) 16 identifies the difference of the surface state based on the number of colors of received light. For example, if reflected light from the subject S is received in at least one pixel of the image sensor 26, the processing device (processor) 16 recognizes that the surface at the object point O corresponding to the pixel is different from the standard surface.

However, as for how the processing device 16 counts the number of colors, various methods can be considered depending on the manner to set background noise (dark current noise or the spectral performance of the sensor or wavelength selection regions). For example, depending on the spectral performance of the sensor 26, even if green light does not reach the sensor 26, an electrical signal corresponding to green light may react by red light. To prevent this, calibration for associating the number of colors with the number of wavelength selection portions 24 and 34 through which light beams have passed is performed by offsetting background noise. By this calibration, the processing device 16 can acquire the correct number of colors.

Since the BRDF has correlation with surface properties/shape, the optical inspection apparatus 10 according to this embodiment can identify the difference of the surface state at each object point O on the surface of the subject S.

According to this embodiment, it is possible to provide the optical inspection apparatus 10 capable of increasing the accuracy of optical inspection of the surface of the subject S, the processing device 16, an optical inspection method, and a non-transitory storage medium storing an optical inspection program.

Third Embodiment

An optical inspection apparatus 10 according to this embodiment will be described in detail with reference to FIG. 14. The optical inspection apparatus 10 according to this embodiment is basically the same as the optical inspection apparatus according to the first embodiment. Differences will be described below.

Figure 14:
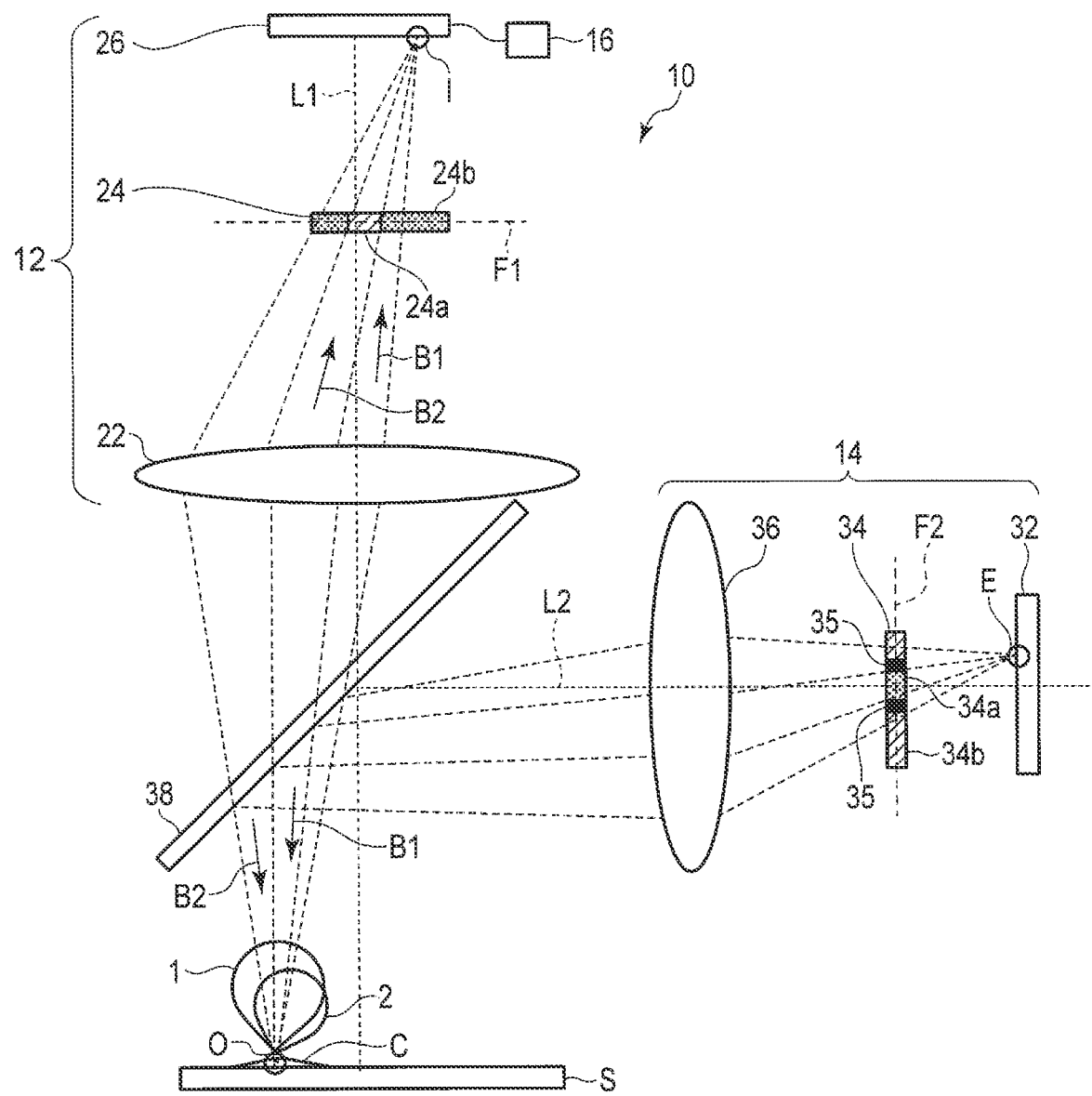
FIG. 14 is a schematic sectional view showing the operation principle of an optical inspection apparatus according to the third embodiment.
Figure 15:
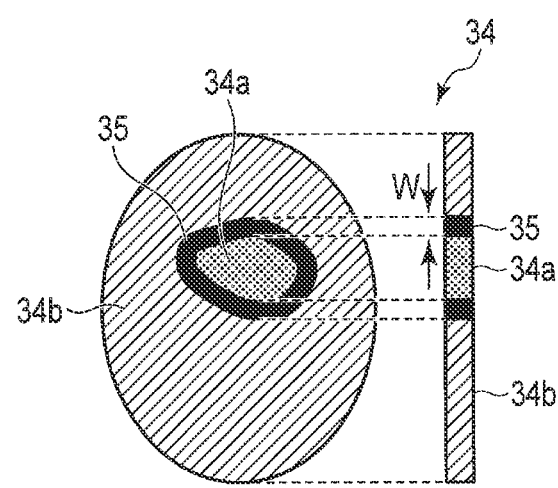
FIG. 15 is a schematic view showing the second wavelength selection portion of the optical inspection apparatus shown in FIG. 14.

In this embodiment, a second wavelength selection portion 34 further includes, for example, a band-shaped wavelength shielding portion 35, as shown in FIGS. 14 and 15.

A width (line width) W of the band of the wavelength shielding portion 35 shown in FIG. 15 is defined as a shielding width.

Assume that the standard surface of a subject S shown in FIG. 14 is a mirror surface, and a BRDF at an object point O on the standard surface includes only a specular reflection component. At this time, in a case where the shielding width W shown in FIG. 15 is 0 (the wavelength shielding portion 35 is absent), if the BRDF spreads due to the presence of unevenness C on the surface of the subject S, or the like, light reception occurs immediately in an image sensor 26. That is, it can be said that if the shielding width W is 0 (the wavelength shielding portion 35 is absent), the sensitivity to the difference of the distribution of the BRDF is very high. On the other hand, when the shielding width W shown in FIG. 15 is increased, a state in which no light beam passing through a first wavelength selection portion 24 exists even if the BRDF spreads a little can be implemented. That is, the sensitivity to the difference of the distribution of the BRDF can be lowered. The advantage is that, for example, if the standard surface of the subject S has a little diffusibility, and the BRDF spreads a little, light reception of reflected light from the standard surface can completely be shielded, and the S/N ratio can be increased. As described above, when the second wavelength selection portion 34 includes the wavelength shielding portion 35, and the shielding width W of the wavelength shielding portion 35 can be adjusted, the sensitivity to the difference of the BRDF can be adjusted.

According to the optical inspection apparatus 10 of this embodiment, since the second wavelength selection portion 34 includes the wavelength shielding portion 35, and the shielding width W is adjusted in accordance with the BRDP, the S/N ratio of detection of a defect such as the unevenness C on the surface of the subject S can be adjusted.

Note that when the shielding width W of the shielding portion 35 is electromagnetically adjusted, the number of lineups of the second wavelength selection portion 34 can be decreased.

In this embodiment, an example in which the second wavelength selection portion 34 includes the shielding portion 35 has been described. A shielding portion corresponding to the shielding portion 35 may be provided between a first wavelength selection region 24a and a second wavelength selection region 24b of the first wavelength selection portion 24. In this case, the shielding portion 35 may be absent.

According to this embodiment, it is possible to provide the optical inspection apparatus 10 capable of increasing the accuracy of optical inspection of the surface of the subject S, a processing device 16, an optical inspection method, and a non-transitory storage medium storing an optical inspection program.

Fourth Embodiment

An optical inspection apparatus 10 according to this embodiment will be described in detail with reference to FIG. 16. This embodiment is basically the same as the optical inspection apparatus 10 according to the first embodiment. Differences will be described below.

A light source 32 of an illumination portion 14 is an LED. The illumination portion 14 includes a pinhole opening 40 on a focal plane F2 of an illumination lens 36. The hole diameter of the pinhole opening 40 is, for example, 0.4 mm. With this configuration, the illumination portion 14 can irradiate a subject with parallel light. The parallel light passes through a second wavelength selection portion 34, and the surface of a subject S is irradiated with the beam via a beam splitter 38.

Note that the second wavelength selection portion 34 of the optical inspection apparatus 10 according to this embodiment is arranged on the optical path on a side closer to the subject S than the illumination lens 36. The arrangement of the second wavelength selection portion 34 is the same as the arrangement of the second wavelength selection portion 34 of the optical inspection apparatus 10 according to the second embodiment (see FIG. 13).

A first wavelength selection portion 24 of the optical inspection apparatus 10 according to this embodiment is arranged between an imaging portion 12 and the subject S. The first wavelength selection portion 24 is arranged on a side closer to the subject S than the imaging lens 22. That is, the first wavelength selection portion 24 is arranged in a place that is not the focal plane of the imaging lens 22. The arrangement of the first wavelength selection portion 24 is different from the arrangement of the first wavelength selection portion 24 of the optical inspection apparatus 10 according to the second embodiment (see FIG. 13). The arrangement of the first wavelength selection portion 24 on a cross section shown in FIG. 16 is reversed in the left-and-right direction from the arrangement of the first wavelength selection portion 24 on the cross section shown in FIG. 13. The first wavelength selection portion 24 and the second wavelength selection portion 34 are complementary to each other.

The operation principle of the optical inspection apparatus 10 according to this embodiment will be described.

Assume that the standard surface on the surface of the subject S is a mirror surface. According to this embodiment, light reflected by the standard surface is wholly shielded by the first wavelength selection portion 24. This is because the first wavelength selection portion 24 and the second wavelength selection portion 34 are complementary to each other.

A case where an uneven shape C (see FIG. 16) exists at an object point O on the surface of the subject S will be considered. A BRDF 1 at the object point O on the surface of the subject S represents a distribution wider than that on the standard surface. This generates light that passes through the first wavelength selection portion 24, and an image sensor 26 receives the light that passes through the first wavelength selection portion 24.

Thus, according to the optical inspection apparatus 10 of this embodiment, it is possible to implement optical inspection with a high S/N ratio for the unevenness C. In this embodiment, the first wavelength selection portion 24 can be arranged afterwards before a commercially available camera in which an imaging lens 22 and the image sensor 26 are integrated. This can obtain an advantage that the versatility of the optical inspection apparatus 10 can be enhanced.

According to this embodiment, it is possible to provide the optical inspection apparatus 10 capable of increasing the accuracy of optical inspection of the surface of the subject S, a processing device 16, an optical inspection method, and a non-transitory storage medium storing an optical inspection program.

Fifth Embodiment

An optical inspection apparatus 10 according to this embodiment will be described in detail with reference to FIG. 17. The optical inspection apparatus 10 according to this embodiment is basically the same as the optical inspection apparatus according to the fourth embodiment. Differences will be described below.

Figure 17:
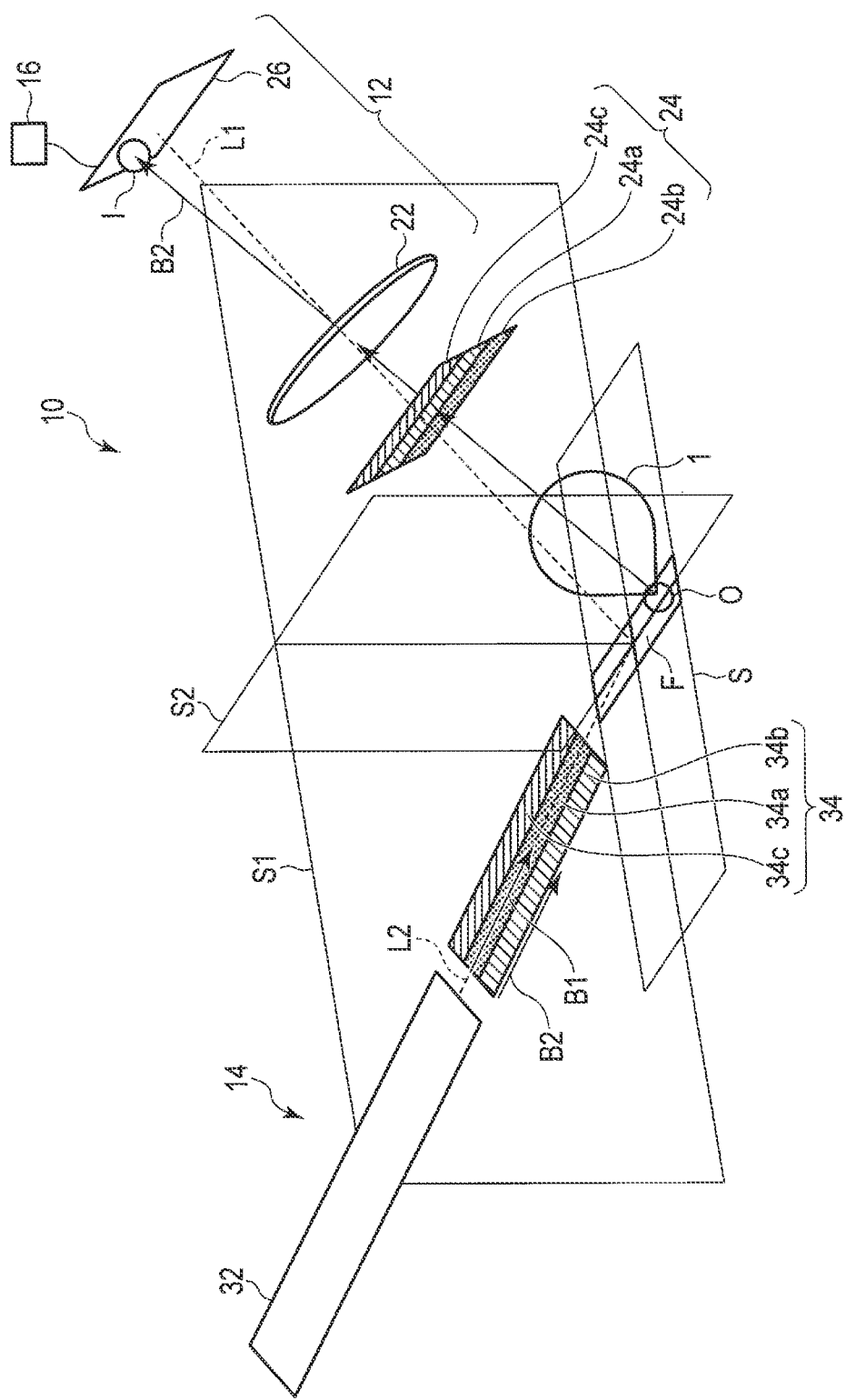
FIG. 17 is a schematic sectional view showing the operation principle of an optical inspection apparatus according to the fifth embodiment.

FIG. 17 is a perspective view of the optical inspection apparatus 10 according to this embodiment.

An illumination portion 14 includes a light source (LED) 32, an opening 40 (see FIG. 16), an illumination lens 36 (see FIG. 16), and a second wavelength selection portion 34. The opening 40 has a slit shape. Here, for example, the slit width is 0.4 mm, and the length is 300 mm in the longitudinal direction. As the light source 32, for example, a plurality of light sources each having a light emitting surface of 1.0 mm×3.0 mm are arranged along the longitudinal direction of the slit of the opening 40. The illumination lens 36 is a cylindrical lens, and is 300 mm long in the longitudinal direction. The focal length is, for example, 50 mm. The slit-shaped opening 40 is arranged on a focal plane F2 of the illumination lens 36. With this configuration, light from the illumination portion 14 forms a line beam. For this reason, the light from the illumination portion 14 changes to parallel light on a first cross section S1 orthogonal to the slit-shaped opening 40. On the other hand, the light from the illumination portion 14 changes to diffused light in a light beam orthographically projected to a second cross section S2 orthogonal to the first cross section S1.

A first wavelength selection portion 24 and the second wavelength selection portion 34 are each formed into a stripe shape and are complementary to each other.

The illumination portion 14 and an imaging portion 12 are arranged such that an optical axis L2 of the illumination lens of the illumination portion 14 and an optical axis L2 of an imaging lens 22 hold a positional relationship of specular reflection with respect to the surface (subject) of a subject S. Note that a beam splitter 38 is not used here.

In FIG. 17, the first cross section S1 includes the optical axes L1 and L2, and the light from the illumination portion 14 is parallel light. On the other hand, a cross section orthogonal to the first cross section S1 is defined as the second cross section S2. In the light beam orthographically projected to the second cross section S2, the light from the illumination portion 14 is not the parallel light but diffused light.

The first wavelength selection portion 24 includes three wavelength selection regions 24a, 24b, and 24c, and the second wavelength selection portion 34 includes three wavelength selection regions 34a, 34b, and 34c. The wavelength selection regions 24a, 24b, 24c, 34a, 34b, and 34c each have a stripe shape.

On the first cross section S1 or a cross section parallel to that, the plurality of wavelength selection regions 24a, 24b, and 24c of the first wavelength selection portion 24 and the plurality of wavelength selection regions 34a, 34b, and 34c of the second wavelength selection portion 34 are arranged. That is, on the first cross section S1, the direction of arraying the plurality of wavelength selection regions 24a, 24b, 24c, 34a, 34b, and 34c is included. On the other hand, on the second cross section S2 orthogonal to the first cross section S1 or a cross section parallel to that, the plurality of wavelength selection regions 24a, 24b, 24c, 34a, 34b, and 34c do not change.

The illumination portion 14 irradiates the surface of the subject S to form an irradiation field F in which the color changes in a stripe pattern.

On the first cross section S1, the spread of the distribution of a BRDF 1 can be identified by the number of colors of light that has passed through the wavelength selection regions 24a, 24b, and 24c of the wavelength selection portion 24. Since the light from the illumination portion 14 is parallel light, the angle of view in a direction corresponding to the cross section S1 is narrow in the imaging portion 12. That is, the imaging range in this direction is narrow. On the other hand, on the second cross section S2 or a cross section parallel to that, the number of colors is constant. This is because, on the cross section S2 or a cross section parallel to that, the wavelength selection regions 24a, 24b, and 24c of the first wavelength selection portion 24 and the wavelength selection regions 34a, 34b, and 34c of the second wavelength selection portion 34 do not change. Since the light from the illumination portion 14 is diffused light in the light beam orthographically projected to the cross section S2, the angle of view in a direction corresponding to the cross section S2 is wide in an image acquired by the imaging portion 12. Thus, in the acquired image, the angle of view is narrow in one of two directions orthogonal to the optical axes L1 and L2, but can be made wide in the direction orthogonal to that. Also, the number of colors at an image point I is the number of wavelength selection regions 24a, 24b, and 24c when the light beam passes through the wavelength selection portion 24 on the first cross section S1.

With these, as compared to a case where the light from the illumination portion 14 is completely changed to parallel light, the angle of view can be made wide as a whole. Also, since the wavelength selection regions are each formed into a stripe shape, the angle of view can be made wide as a whole as compared to the otherwise case.

In addition, like the optical inspection apparatus 10 according to the fourth embodiment (see FIG. 16), since the first wavelength selection portion 24 is arranged in front of the imaging portion 12, the optical system can be constructed for any imaging portion (that is, the camera) 12. That is, the range of choice for the camera can be expanded by this configuration. That is, since the light that has passed through the wavelength selection portion 24 passes through the imaging lens 22 for image capturing, the wavelength selection portion 24 can easily be arranged.

According to this embodiment, it is possible to provide the optical inspection apparatus 10 capable of increasing the accuracy of optical inspection of the surface of the subject S, a processing device 16, an optical inspection method, and a non-transitory storage medium storing an optical inspection program.

According to at least one of the above-described embodiments, it is possible to provide the optical inspection apparatus 10 capable of increasing the accuracy of optical inspection of the surface of the subject S, the processing device 16, an optical inspection method, and a non-transitory storage medium storing an optical inspection program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical inspection apparatus comprising:
    an imaging portion including an image sensor configured to capture a subject by reflected light from the subject, the reflected light occurring upon illuminating the subject;
    a first wavelength selection portion provided on an optical axis of the imaging portion and configured to selectively pass one or more light components of the reflected light, the one or more light components having predetermined wavelengths;
    an illumination portion configured to emit illumination light for illumination of the subject; and
    a second wavelength selection portion provided on an optical axis of the illumination portion and configured to pass a plurality of light components of the illumination light complementarily to the first wavelength selection portion, the plurality of light components illuminating the subject and including the one or more light components having the predetermined wavelengths, wherein:

the first wavelength selection portion comprises:
   a (1-1)th region configured to shield against light of a first wavelength and pass light of a second wavelength different from the first wavelength toward the image sensor; and
   a (1-2)th region configured to pass the light of the first wavelength toward the image sensor and shield against the light of the second wavelength, the second wavelength selection portion comprises:
   a (2-1)th region having a shape similar to the (1-1)th region and configured to pass the light of the first wavelength toward the subject and shield against the light of the second wavelength; and
   a (2-2)th region having a shape similar to the (1-2)th region and configured to pass the light of the second wavelength toward the subject and shield against the light of the first wavelength, and the image sensor is configured to detect, in each pixel of the image sensor:
   whether or not at least one of the one or more light components having the predetermined wavelengths is incident on the image sensor; or
   a number of colors corresponding to the one or more light components having the predetermined wavelengths and being incident on the image sensor.

2. The apparatus according to claim 1, wherein at least one of the first wavelength selection portion and the second wavelength selection portion includes a wavelength shielding portion configured to shield against the illumination light from the illumination portion.

3. The apparatus according to claim 2, wherein the wavelength shielding portion has a band shape, a width of the band is defined as a shielding width, and the shielding width is configured to be adjusted.

4. The apparatus according to claim 1, wherein
the imaging portion comprises a first imaging optical element,
the illumination portion comprises a second imaging optical element,
the first wavelength selection portion is arranged on a focal plane of the first imaging optical element, and has anisotropy to the optical axis of the imaging portion, and
the second wavelength selection portion is arranged on a focal plane of the second imaging optical element, and has anisotropy to the optical axis of the illumination portion.

5. The apparatus according to claim 1, wherein
the imaging portion comprises a first imaging optical element,
the first wavelength selection portion is arranged near a focal plane of the first imaging optical element of the imaging portion,
the illumination portion comprises a second imaging optical element, and
the second wavelength selection portion is arranged on a focal plane of the second imaging optical element of the illumination portion.

6. The apparatus according to claim 1, wherein
the illumination portion is configured to irradiate the subject with parallel light, and
the first wavelength selection portion is arranged between the imaging portion and the subject.

7. The apparatus according to claim 1, further comprising a beam splitter between the subject and the imaging portion, and
the beam splitter is a polarization beam splitter.

8. A processing device comprising:
a processor configured to:
   detect, in each pixel of the image sensor of the optical inspection apparatus defined in claim 1, a presence/absence of light reception of reflected light from the subject, and
   in each pixel of the image sensor, if the detection result indicates the absence of light reception, output that an object point of the subject corresponding to the pixel is on a standard surface, and if the detection result indicates the presence of light reception, output that the object point on a surface of the subject corresponding to the pixel is on a surface different from the standard surface.

9. A processing device comprising:
a processor configured to:
   detect, in each pixel of the image sensor of the optical inspection apparatus defined in claim 1, a presence/absence of light reception of reflected light from the subject, and
   in each pixel of the image sensor, if the detection result indicates the absence of light reception, output that an object point of the subject corresponding to the pixel is on a surface different from a standard surface, and if the detection result indicates the presence of light reception, output that the object point on a surface of the subject corresponding to the pixel is on the standard surface.

10. An optical inspection method of inspecting a surface of a subject using an optical inspection apparatus defined in claim 1, the method comprising:
detecting, in each pixel of the image sensor, a presence/absence of light reception of reflected light from the subject, or a number of colors corresponding to the one or more light components having the predetermined wavelengths and being incident on the image sensor; and
outputting, in each pixel of the image sensor, a difference between a standard surface and a surface at an object point corresponding to the pixel based on a detection result of the presence/absence of light reception or the number of colors.

11. The method according to claim 10, wherein a difference of a surface state is identified based on the number of colors of light received in a least one pixel of the image sensor.

12. A non-transitory storage medium storing an optical inspection program configured to inspect a surface of a subject using an optical inspection apparatus defined in claim 1, the optical inspection program causing a computer to execute:
processing of detecting, in each pixel of the image sensor, a presence/absence of light reception of reflected light from the subject, or a number of colors corresponding to the one or more light components having the predetermined wavelengths and being incident on the image sensor; and
processing of outputting, in each pixel of the image sensor, a difference between a standard surface and a surface at an object point corresponding to the pixel based on a detection result of the presence/absence of light reception or the number of colors.

\* \* \* \* \*